Aug. 26, 1941.  E. D. DICKINSON  2,253,970
TURBINE DRIVEN GEAR ARRANGEMENT AND THE LIKE
Filed Feb. 14, 1940
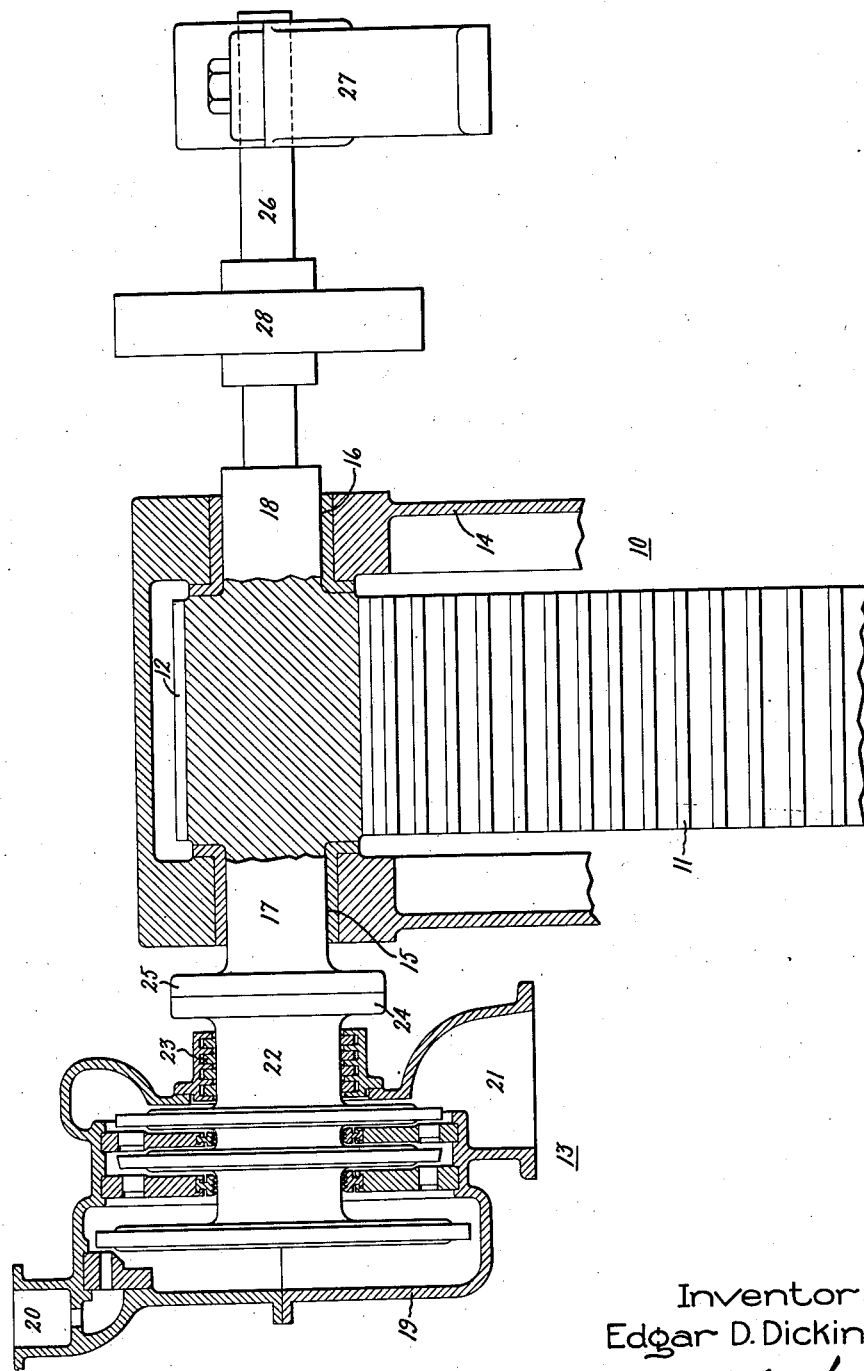
Inventor:
Edgar D. Dickinson,
by Harry E. Dunham
His Attorney.

Patented Aug. 26, 1941

2,253,970

UNITED STATES PATENT OFFICE 2,253,970

TURBINE DRIVEN GEAR ARRANGEMENT AND THE LIKE

Edgar D. Dickinson, Beverly, Mass., assignor to General Electric Company, a corporation of New York Application February 14, 1940, Serial No. 318,965

4 Claims. (Cl. 74—189.5)

The present invention relates to turbine driven gear arrangements and the like such as are used for example to drive ship propellers where one or several elastic fluid turbines are arranged to drive a propeller through the intermediary of a gearing. More specifically the invention relates to the kind of arrangements which include a gearing having a gear wheel or pinion with an overhung shaft supporting a turbine rotor. In arrangements of this kind the bearings supporting the gear wheel or pinion which is directly driven by the turbine are subject to considerable forces, which forces with regard to the bearing adjacent the turbine act downward and with regard to the bearing on the opposite side of the pinion act upward. During operation these forces tend to wear the bearings in opposite directions at opposite ends, thereby reducing considerably the tooth contact between the gear or gears meshing with the pinion and causing rapid wear of the teeth.

One object of my invention is to provide an improved construction of turbine driven gear arrangements of the type above specified whereby the desired tooth contact of the gearing is maintained during operation. Another object of my invention is to provide an improved arrangement for balancing a gear wheel or pinion shaft having an overhung shaft portion carrying a comparatively heavy machine element such as a turbine rotor. This is accomplished in accordance with my invention by an arragement in which the gear wheel or pinion shaft opposite the turbine or heavy machine element is extended and the extension supported by an auxiliary or stabilizing bearing considerably spaced from the gear wheel or pinion.

For a better understanding of what I believe to be novel and my invention, attention is directed to the following description and the claims appended thereto in connection with the accompanying drawing.

The single figure of the drawing illustrates diagrammatically a turbine driven gear arrangement embodying my invention.

The arrangement comprises a gearing 10 having a gear 11 meshing with a pinion 12 driven by an elastic fluid turbine 13. The pinion 12 and the gear 11 are enclosed in a housing 14 which forms journal bearings 15 and 16 for rotatably supporting shaft portions 17 and 18 respectively of the pinion 12. The turbine 13 is of the axial flow type and includes a casing 19 forming an inlet 20 and an exhaust conduit 21. The gear housing 14 and the turbine casing 19 are supported on a suitable foundation (not shown). A rotor 22 is enclosed in the casing 19 and sealed thereto by a packing 23. The rotor shaft portion projecting through the right-hand end of the casing 19 has a flange 24 which is suitably secured to a flange 25 on the overhung pinion shaft portion 17. The turbine rotor is completely supported on the pinion shaft, the left-hand end of the turbine rotor being free from any bearing support. As stated above, the comparatively heavy weight of the turbine rotor causes a considerable downward force on the journal bearing 15 and an upward force on the journal bearing 16. Ordinarily these forces would tend to move the pinion 12 out of alinement with the gear 11, thereby reducing the contact between them and causing rapid wear of the teeth of the pinion and the gear. In order to prevent such rapid wear of the teeth of the gearing I provide in accordance with my invention means for stabilizing the pinion shaft to reduce misalinement of the gear 11 and the pinion 12. To this end the pinion shaft portion 18, that is, the pinion shaft opposite the turbine is provided with a shaft extension 26 and the outer end of the extension 26 is supported on a comparatively small auxiliary bearing 27. In addition the arrangement in the present instance includes a weight 28 secured to the shaft extension 26 for counterbalancing the weight of the turbine rotor 22. In the present example the shaft extension 26 has a diameter smaller than that of the shaft portion 17 and 18; the size of the auxiliary bearing 27 is smaller than that of the main bearings 15, 16. The bearing 27 is spaced from the gearing a distance about equal the span of the gearing. The spacing in general depends upon the diameter of the shaft, the amount of the overhung loading and the magnitude of the counterweight 28 applied to the shaft extension 26. Increased counterweight permits a reduction of the length of the shaft extension.

During operation the bearing 27 holds the pinion shaft in alinement and assures uniform load distribution and satisfactory contact between the teeth of the pinion and the gear. Thus, in accordance with my invention, a pinion or gear wheel supported on a gear casing and driven by a turbine or like machine having an element held on an overhung portion of the pinion shaft is stabilized by extending the pinion shaft opposite the turbine and supporting the extension by an auxiliary bearing considerably spaced from the pinion. Without the provision of such shaft extension and an auxiliary bearing it would be necessary in many cases to provide a bearing and a packing at the high pressure end of the turbine, an arrangement which is more expensive and also less efficient in view of packing leakage which becomes appreciable in high pressure turbines.

Having described the method of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Turbine driven gear arrangement including the combination of a gearing having a casing, a pinion with a shaft and main bearings on both sides of the pinion for supporting the shaft on the casing, a turbine having a rotor completely supported on an overhung portion of the pinion shaft, and means to prevent misalinement of the pinion, said means comprising an extension for the pinion shaft on the side opposite the turbine and an auxiliary bearing supporting the outer end of the extension.

2. Turbine driven gear arrangement including the combination of a gearing having a casing and a pinion with a shaft supported on the casing, a turbine having a rotor completely supported on an overhung portion of the pinion shaft, the pinion shaft on the side opposite the turbine forming an extension, an auxiliary bearing supporting the outer end of the extension to maintain the pinion in alinement during operation, and a weight secured to the pinion shaft extension to counterbalance the weight of the turbine rotor.

3. The combination of a gearing having a pinion with shaft portions on both ends and two main bearings supporting the shaft portions, a machine having a rotor completely supported on one of the pinion shaft portions, the other pinion shaft portion having an extension reduced in diameter, and an auxiliary bearing considerably spaced from the main bearings for supporting the free end of the extension to maintain the pinion in alinement.

4. The combination of a gearing with a gear, a pinion meshing with the gear and having a first and a second shaft portion on opposite ends, a first and a second main bearing for supporting the shaft portions, a machine having a rotor secured to and completely supported on the first shaft portion, and means to maintain the pinion in alinement with the gear during operation comprising a shaft extension having an end secured to the second shaft portion and an auxiliary bearing smaller than the main bearings for supporting the other end of the extension.

EDGAR D. DICKINSON.